(12) United States Patent
Kim et al.

(10) Patent No.: US 11,644,569 B2
(45) Date of Patent: May 9, 2023

(54) LIDAR DEVICE

(71) Applicant: SAMSUNG ELECTRONICS CO., LTD., Suwon-si (KR)

(72) Inventors: Myungsik Kim, Suwon-si (KR); Minsu Hwangbo, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1020 days.

(21) Appl. No.: 16/422,257

(22) Filed: May 24, 2019

(65) Prior Publication Data
US 2019/0361119 A1 Nov. 28, 2019

Related U.S. Application Data

(60) Provisional application No. 62/676,065, filed on May 24, 2018.

(30) Foreign Application Priority Data

Dec. 11, 2018 (KR) .................. 10-2018-0159089

(51) Int. Cl.
*G01S 17/00* (2020.01)
*G01S 17/08* (2006.01)

(52) U.S. Cl.
CPC .................. *G01S 17/08* (2013.01)

(58) Field of Classification Search
USPC ........................................ 356/5.01
See application file for complete search history.

(56) References Cited

U.S. PATENT DOCUMENTS

| 8,767,037 | B2 * | 7/2014 | Krishnan | .............. | G06T 3/4038 |
| | | | | | 348/69 |
| 8,988,664 | B2 * | 3/2015 | Suzuki | .................... | G01S 17/02 |
| | | | | | 356/3.01 |
| 8,996,172 | B2 | 3/2015 | Shah et al. | | |
| 9,239,389 | B2 | 1/2016 | Jeong et al. | | |

(Continued)

FOREIGN PATENT DOCUMENTS

| CN | 103033819 A | 4/2013 |
| CN | 103293530 A | 9/2013 |

(Continued)

OTHER PUBLICATIONS

Konolige, K., et al., "A Low-Cost Laser Distance Sensor", May 19-23, 2008, 2008 IEEE International Conference on Robotics and Automation, pp. 3002-3008, 7 pages total.

(Continued)

*Primary Examiner* — James R Hulka
(74) *Attorney, Agent, or Firm* — Sughrue Mion, PLLC

(57) ABSTRACT

A light detection and ranging (LIDAR) device is provided. The LIDAR device includes: a light source configured to emit first light, a first reflector configured to omnidirectionally receive second light that is light reflected or scattered by an object that is irradiated by the first light, and reflect the second light, a light detector including a pixel array, the light detector being configured to detect the second light reflected from the first reflector, and a processor configured to acquire location information of the object based on detection of the second light by the light detector.

15 Claims, 9 Drawing Sheets

(56) References Cited

U.S. PATENT DOCUMENTS

| | | | |
|---|---|---|---|
| 10,088,557 | B2 | 10/2018 | Yeun |
| 10,185,033 | B2 * | 1/2019 | Justice .................... G01S 17/89 |
| 10,215,857 | B2 * | 2/2019 | Oggier .................... G01S 17/42 |
| 11,022,689 | B2 * | 6/2021 | Villeneuve .......... H01S 3/06733 |
| 11,092,672 | B2 * | 8/2021 | Jeong .................... G01S 7/4817 |
| 11,327,488 | B2 * | 5/2022 | You ........................ G01S 17/04 |
| 2010/0030380 | A1 * | 2/2010 | Shah ........................ G01S 17/48 901/1 |
| 2011/0018964 | A1 | 1/2011 | Krishnan et al. |
| 2013/0002823 | A1 | 1/2013 | Lim et al. |
| 2013/0076893 | A1 * | 3/2013 | Jeong .................... G01S 17/00 348/135 |
| 2016/0274222 | A1 | 9/2016 | Yeun |
| 2018/0011490 | A1 | 1/2018 | You et al. |
| 2018/0017668 | A1 | 1/2018 | Cottin et al. |
| 2018/0059223 | A1 | 3/2018 | Jeong et al. |
| 2018/0069367 | A1 | 3/2018 | Villeneuve et al. |
| 2018/0081060 | A1 | 3/2018 | Justice et al. |

FOREIGN PATENT DOCUMENTS

| | | |
|---|---|---|
| CN | 204789994 U | 11/2015 |
| CN | 105807284 A | 7/2016 |
| CN | 107209265 A | 9/2017 |
| CN | 107430187 A | 12/2017 |
| KR | 10-2013-0001762 A | 1/2013 |
| KR | 10-2013-0034573 A | 4/2013 |
| KR | 10-2014-0109158 A | 9/2014 |
| KR | 10-2016-0113794 A | 10/2016 |
| KR | 10-2018-0014974 A | 2/2018 |
| KR | 10-2018-0026997 A | 3/2018 |

OTHER PUBLICATIONS

Communication dated Feb. 2, 2021 by the European Patent Office in European Patent Application No. 19807904.8.

Communication dated Dec. 1, 2021 issued by the China National Intellectual Property English Administration in Chinese Application No. 201980032606.4.

International Search Report and Written Opinion (PCT/ISA/210 and PCT/ISA/237), dated Aug. 28, 2019 by International Searching Authority in International Application No. PCT/KR2019/006133.

Communication dated Jul. 21, 2022 issued by the China National Intellectual Property Administration in English Chinese Application No. 201980032606.4.

Communication dated Nov. 1, 2022 issued by the State Intellectual Property Office of the People's Republic of China in Chinese Patent Application No. 201980032606.4.

Communication dated Dec. 9, 2022 issued by European Patent Office in European Patent Application No. 19807904.8.

* cited by examiner

LIDAR DEVICE

CROSS-REFERENCE TO RELATED APPLICATION(S)

This application is based on and claims the benefit of U.S. Provisional Patent Application No. 62/676,065, filed on May 24, 2018, in the United States Patent and Trademark Office, and claims priority under 35 U.S.C. § 119 to Korean Patent Application No. 10-2018-0159089, filed on Dec. 11, 2018, in the Korean Intellectual Property Office, the disclosures of which are incorporated herein by reference in their entireties.

BACKGROUND

1. Field

The disclosure relates to a light detection and ranging (LIDAR) device.

2. Description of Related Art

There has been increasing interest in techniques of measuring a distance to an object or a direction thereof by using light (beams). In relation to this interest, research has been conducted on light sources which emit light and methods of steering a direction of light (beams) generated from such light sources or receiving light from a desired direction, that is, light scanning methods.

To perform scanning in a desired direction by using light, a method of mechanically rotating a light source or an optical element and a method of using interference of a bundle of light emitted from a plurality of unit cells or a plurality of waveguides by using an optical phased array (OPA) scheme have been generally used. In a method of mechanically rotating a light source, a motor or a micro-electromechanical system (MEMS) mirror is used, and thus a volume may be large, and costs may increase. In an OPA scheme, a direction of light may be changed by electrically or thermally controlling unit cells or waveguides. Because an OPA scheme uses a plurality of waveguides, a total volume may be large, and an error may occur during modulation of a phase. In addition, a plurality of light sources are needed to transfer light to each of the waveguides.

SUMMARY

Provided is a light detection and ranging (LIDAR) device for transmitting and receiving light without a motor.

Additional aspects will be set forth in part in the description which follows and, in part, will be apparent from the description, or may be learned by practice of the presented embodiments of the disclosure.

In accordance with an aspect of the disclosure, there is provided a light detection and ranging (LIDAR) device including a first light source configured to emit first light, a first reflector configured to omnidirectionally receive second light that is light reflected or scattered by an object that is irradiated by the first light, and reflect the second light, a light detector including a pixel array, the light detector being configured to detect the second light reflected from the first reflector, and a processor configured to acquire location information of the object based on detection of the second light by the light detector.

The first reflector may include a cavity that is a vacant space provided inside an upper area of the first reflector, and the first light source may be provided in the cavity.

The first reflector may include a reflective surface symmetrical with reference to a central axis of the first reflector, the first reflector having a tapered shape with a width gradually narrowing from an upper area of the first reflector to a lower area of the first reflector.

The reflective surface may include an area with a constant angle of inclination with respect to the central axis of the first reflector.

The reflective surface may include an area with a variable angle of inclination with respect to the central axis of the first reflector.

The first reflector may include at least one of an inverse hemispherical shape, an inverse semielliptical shape, and a reverse-conical shape.

The location information of the object may include at least one of a direction of the object with respect to the LIDAR device, a height of the object from a ground surface, or a distance to the object from the LIDAR device.

The processor may be further configured to determine at least one of a direction of the object with respect to the LIDAR device based on an azimuth of a pixel of the light detector, the pixel having detected the second light, a height of the object from a ground surface based on a distance from the pixel of the light detector which has detected the second light to a reference point, and a distance to the object from the LIDAR device based on a detection time at which the light detector detects the second light.

The first light source, the first reflector, and the light detector may be sequentially provided along a central axis.

The first light source may overlap the first reflector.

The LIDAR device may further include a light path changer configured to change a path of the first light that is emitted from the first light source to be incident to the first reflector, and change a path of the second light that is reflected from the first reflector to be incident to the light detector.

The light path changer may be further configured to transmit the first light that is emitted from the first light source to be incident on the first reflector, and reflect the second light that is reflected from the first reflector to be incident on the light detector.

The light path changer may include a hole through which the first light emitted from the first light source is transmitted.

The light path changer may be further configured to reflect the first light that is emitted from the first light source to be incident on the first reflector, and transmit the second light that is reflected from the first reflector to be incident on the light detector.

The light path changer may include at least one of a beam splitter and a transflective film.

The LIDAR device may further include a diffuser configured to diffuse the first light.

The LIDAR device may further include a condensing lens provided between the first reflector and the light detector, the condensing lens being configured to condense the second light that is incident from the first reflector to be incident on the light detector.

The LIDAR device may further include a second light source configured to emit light to a second space other than a first space to which the first light is emitted, wherein the first space and the second space at least partially do not overlap.

In accordance with an aspect of the disclosure, there is provided a light detection and ranging (LIDAR) device including a light source configured to emit first light, a reflector configured to omnidirectionally reflect the first light that is incident on the reflector, a fisheye lens configured to omnidirectionally receive second light that is light reflected or scattered by an object that is irradiated by the first light reflected from the reflector, and refract the second light, and a light detector including a pixel array, the light detector being configured to detect the second light that is refracted from the fisheye lens.

The reflector may include a reflective surface symmetrical with reference to a central axis of the reflector, the reflector having a tapered shape with a width gradually narrowing from an upper area of the reflector to a lower area of the reflector, and the fisheye lens may be provided to be shifted away from the central axis of the first reflector.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
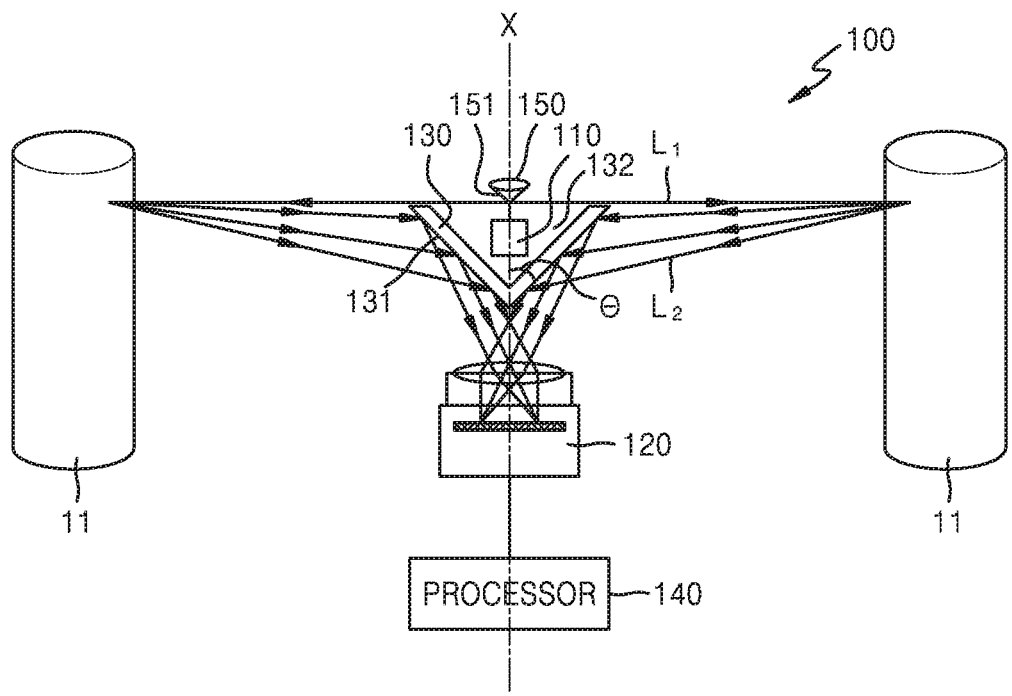
FIG. 1 illustrates a LIDAR device according to an embodiment.

Hereinafter, LIDAR devices according to embodiments of the disclosure will be described in detail with reference to the accompanying drawings. Like reference numerals in the drawings denote like elements, and thus their repetitive description will be omitted.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

Although terms, such as "first" and "second", can be used to describe various elements, the elements cannot be limited by the terms. The terms can be used to classify a certain element from another element.

Throughout the disclosure, the expression "at least one of a, b or c" indicates only a, only b, only c, both a and b, both a and c, both b and c, all of a, b, and c, or variations thereof.

FIG. 1 illustrates a LIDAR device 100 according to an embodiment. As shown in FIG. 1, the LIDAR device 100 may include a light source 110 emitting first light L1, a light detector 120 configured to detect second light L2 that is a portion of the first light L1 reflected or scattered by an object 11 among the first light L1, a first reflector 130 omnidirectionally receiving the second light L2 and reflecting the second light L2 to the light detector 120, and a processor 140 configured to acquire location information of the object 11 by using a detection result of the light detector 120.

The light source 110 may emit light. For example, the light source 110 may emit light in an infrared region. Using light in the infrared region may reduce or prevent the light in the infrared region from being mixed with natural light in a visible light region, including the sunlight. However, the light source 110 is not necessarily limited to emitting light in the infrared region and may emit light in various wavelength regions. When light in a wavelength region other than the infrared region is emitted by the light source 110, correction for removing information of mixed natural light may be required.

The light source 110 may be a laser light source, but is not limited to particular examples. The light source 110 may be any one of an edge emitting laser, a vertical-cavity surface emitting laser (VCSEL), and a distributed feedback laser. For example, the light source 110 may be a laser diode.

The light detector 120 may convert the second light L2 reflected or scattered by the object 11 among the first light L1 into an electrical signal, e.g., a current. The first light L1 emitted from the light source 110 may be emitted on the object 11 and reflected or scattered by the object 11. Light reflected or scattered by the object 11 among the first light L1 is the second light L2. The first light L1 and the second light L2 may have the same wavelength and different intensities.

The light detector 120 may include a plurality of pixels arranged in an array form. The plurality of pixels may be arranged in a matrix form. Each of the pixels, as a light-receiving element, may output an electrical signal corresponding to the second light L2, e.g., a current. A direction, a height, or the like of the object 11 may be determined based on a location of a pixel which has detected the second light L2 among the pixels.

Each of the pixels may be a light-receiving element operating in a state in which a bias voltage is applied thereto. For example, the light detector 120 may include an avalanche photo diode (APD) or a single photon avalanche diode (SPAD). The light detector 120 may have a circuit configuration of an analog front end (AFE), a time digital counter (TDC), and the like according to whether the light detector 120 includes the APD or the SPAD as a light-receiving element.

The light detector 120 may further include a current-voltage conversion circuit configured to convert the output current into a voltage and an amplifier configured to amplify an amplitude of the voltage. In addition, the light detector 120 may further include a lens condensing the second light L2 reflected or scattered by the object 11 and a filter, e.g., a high-pass filter, filtering an electrical signal of a certain frequency.

The first reflector 130 omnidirectionally receives the second light L2 and reflects the second light L2 to the light detector 120. The first reflector 130 may be symmetrical with reference to a central axis X. For example, the first reflector 130 may include at least one of a reverse-cone shape, an inverse hemispherical shape, or an inverse semielliptical shape. In addition, a cross-section of the first reflector 130 may include at least one of a circle, a polygon, or an ellipse. Although FIG. 1 shows the first reflector 130 of a reverse-cone shape, the first reflector 130 is not limited thereto.

A first reflective surface 131 having a tapered shape with a width gradually narrowing from an upper area to a lower area thereof may be included on the outer circumferential surface of the first reflector 130. The first reflective surface 131 may have an angle of inclination θ with respect to the central axis X. For example, the first reflective surface 131 may include an area having a constant angle of inclination with respect to the central axis X and include an area having a variable angle of inclination with respect to the central axis X. Although FIG. 1 shows that the angle of inclination θ of the first reflective surface 131 is constant, the angle of inclination θ is not limited thereto and may vary.

The first reflective surface 131 may be formed using a material having a relatively high refractive index. For example, the first reflective surface 131 may be formed using a white resin, a metal, a reflective paint, and the like of a relatively high refractive index. The white resin may include a white foam polyethylene terephthalate (PET) material, a white polycarbonate material, or the like. Reflectivity of these materials are about 97%, and the reflection loss of light may be small, and thus, the reduction in efficiency may be small. The metal may include at least one selected from the group consisting of highly reflective metals, e.g., silver (Ag), aluminum (Al), gold (Au), copper (Cu), palladium (Pd), platinum (Pt), rhodium (Rh), and an alloy thereof. The first reflective surface 131 may be formed by deposition. The reflective paint may include reflective materials such as titanium oxide ($TiO_2$), zinc oxide (ZnO), calcium carbonate ($CaCo_3$), and the like having a reflectivity of 80-90%, taken alone or in combination. The reflective paint may be diluted in a solvent together with an adhesive and coated on a material such as plastic. As a coating method, a spray, a roller, or the like may be used.

Based on the first reflector 130 having a symmetrical shape with reference to the central axis X, the first reflector 130 may receive light incident in an omnidirection of a lateral direction. Herein, the lateral direction may indicate a direction perpendicular to the central axis X of the first reflector 130, and the omnidirection of the lateral direction may indicate 360 degrees of the direction perpendicular to the central axis X of the first reflector 130. In addition, because the first reflector 130 includes the first reflective surface 131 having a tapered shape with a width gradually narrowing from an upper area to a lower area thereof, the first reflector 130 may reflect incident light downward such that the reflected light is converged.

Therefore, the LIDAR device 100 according to an embodiment does not have to rotate the light detector 120, the first reflector 130, or the like to detect the second light L2. Because a motor for rotating the first reflector 130 or the light detector 120 may not be included, a structure of the LIDAR device 100 may be more simplified.

The light source 110, the first reflector 130, and the light detector 120 may be sequentially arranged on the central axis X. For example, the light source 110 may be arranged at an upper side of the first reflector 130, and the light detector 120 may be arranged at a lower side of the first reflector 130 opposite to the light source 110.

The first reflector 130 may include a cavity 132 that is a vacant space inside an upper area thereof, and the light source 110 may be arranged in the cavity 132. Based on the light source 110 and the first reflector 130 being arranged in an overlapping manner, a size of the LIDAR device 100 may be reduced.

In addition, a second reflector 150 omnidirectionally emitting light may be further arranged at an upper side of the light source 110. The second reflector 150 may include a reflective surface 151 having a tapered shape with a width gradually narrowing from an upper area to a lower area thereof. The reflective surface 151 of the second reflector 150 may include an area having a constant angle of inclination with respect to the central axis X and include an area having a variable angle of inclination with respect to the central axis X. Although FIG. 1 shows that the reflective surface 151 of the second reflector 150 has a reverse-cone shape, the reflective surface 151 is not limited thereto.

Based on the second reflector 150 including the reflective surface 151 having a tapered shape with a width gradually narrowing from an upper area to a lower area thereof, the second reflector 150 may reflect light incident from a lower side to the lateral direction. Based on the second reflector 150 having a symmetrical shape with reference to the central axis X, the second reflector 150 may omnidirectionally emit light. Although FIG. 1 shows that the first reflector 130 has the same shape as the second reflector 150, the first reflector 130 and the second reflector 150 are not limited thereto. The first reflector 130 may have a shape different from that of the second reflector 150, and the first reflector 130 and the second reflector 150 may have the same size or different sizes.

The processor 140 may determine location information of the object 11 by using a detection result of the light detector 120. The location information of the object 11 may include at least one of a direction, a height, or a distance to the object 11 from the LIDAR device 100. The processor 140 may determine at least one of the direction or the height where the object 11 exists by using a location of a pixel in the light detector 120 which has detected light, and determine the distance to the object 11 by using a light detection time of the pixel.

The processor 140 may determine the direction where the object 11 exists by using an azimuth of a pixel in the light detector 120, the pixel having detected the second light L2. The processor 140 may determine the height of the object 11, e.g., a height from the ground to the object 11, by using a distance from the pixel which has detected the second light L2 to a reference point of the light detector 120, e.g., a point where the central axis X meets the light detector 120. For example, the processor 140 may determine that the greater the distance from the pixel which has detected the second light L2 to the reference point, the greater the height of the object 11.

In addition, the processor 140 may detect a peak from an electrical signal applied from the light detector 120. The processor 140 may detect the peak by detecting a central location of the electrical signal detecting a width of the electrical signal in an analog way. The processor 140 may detect the peak by converting the electrical signal into a digital signal, and then detecting a leading edge and a trailing edge of the digital signal or detect the peak by using a constant fraction discriminator (CFD) scheme. The processor 140 may further include a comparator to output the detected peak as a pulse signal.

The processor 140 may determine the distance of the object 11 by using the detected peak. For example, the processor 140 may measure the distance of the object 11 by using a detection time of the detected peak and an emission time of the light emitted from the light source 110.

Based on the processor 140 determining the distance of the object 11 by using a light emission time of the light source 110 and a light detection time of the light detector 120, unlike a triangulation method, a constant distance between the light source 110 and the light detector 120 does not have to be maintained. Therefore, the LIDAR device 100 may be miniaturized.

FIG. 1 shows that the first reflector 130 and the light detector 120 are sequentially arranged on the central axis X. The light source 110 and the second reflector 150 may be a light transmission end, and the first reflector 130 and the light detector 120 may be a light reception end. However, embodiments are not limited thereto. The first reflector 130 may not only reflect the second light L2 reflected from the object 11 to the light detector 120 but also omnidirectionally reflect and emit the first light L1 output from the light source 110. That is, the first reflector 130 may be one component of the light transmission end and one component of the light reception end.

Figure 2:
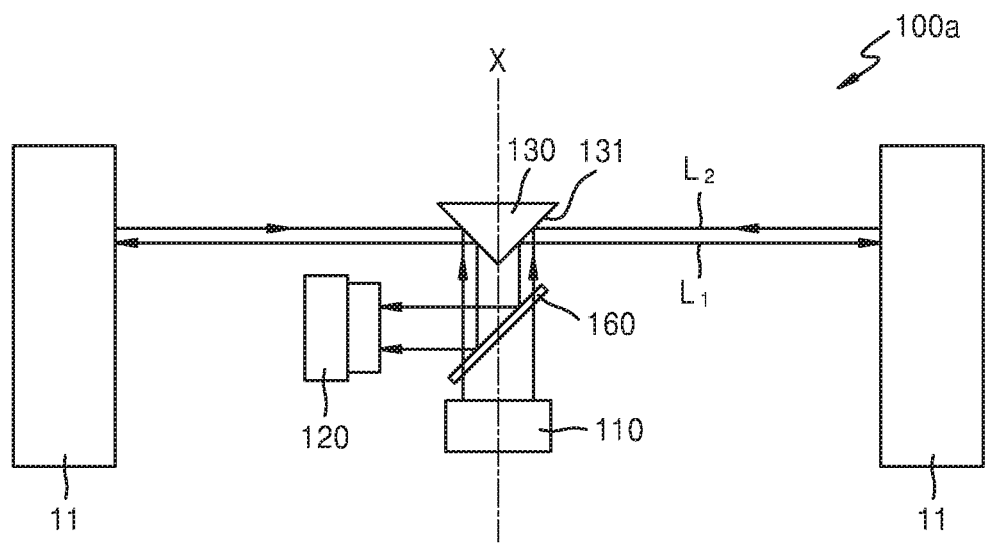
FIG. 2 illustrates a LIDAR device including a light path changer according to an embodiment.

FIG. 2 illustrates a LIDAR device 100*a* including a light path changer 160 according to an embodiment. When compared with the LIDAR device 100 of FIG. 1, the LIDAR device 100*a* of FIG. 2 may further include the light path changer 160 changing the path of the first light L1 emitted from the light source 110 to be incident to the first reflector 130 and changing the path of the second light L2 reflected from the object 11 to be incident to the light detector 120. The light path changer 160 may include at least one of a beam splitter or a transflective film.

As shown in FIG. 2, the light path changer 160 may be arranged between the first reflector 130 and the light source 110 along a central axis X. In addition, the light source 110 may be arranged in the lateral direction of the light path changer 160. Accordingly, the light path changer 160 may transmit the first light L1 emitted from the light source 110 such that the first light L1 is incident to the first reflector 130 and reflect the second light L2 reflected from the object 11 such that the second light L2 is incident to the light detector 120. As described above, the light source 110 and the light detector 120 may be arranged at a lower side of the first reflector 130, thereby reducing a height of the LIDAR device 100*a*. In addition, without the second reflector 150, the first reflector 130 may omnidirectionally emit the first light L1 and omnidirectionally receive the second light L2.

Figure 3:
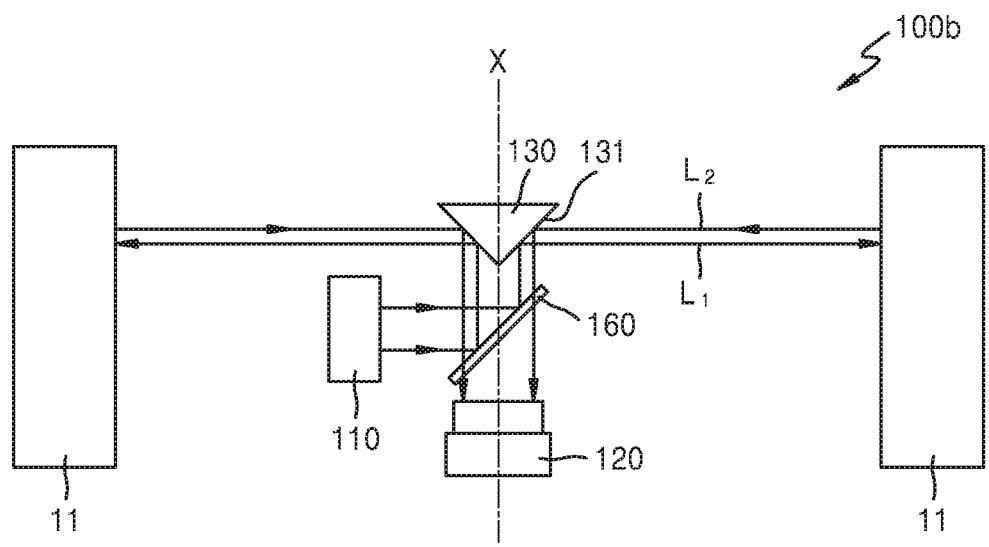
FIG. 3 illustrates a LIDAR device according to an embodiment.

FIG. 3 illustrates a LIDAR device 100*b* according to an embodiment. When compared with FIG. 2, the light source 110 shown in FIG. 3 may be arranged in the lateral direction of the light path changer 160, and the light detector 120 may be arranged at a lower side of the light path changer 160. Accordingly, the light path changer 160 may reflect the first light L1 emitted from the light source 110 such that the first light L1 is incident to the first reflector 130 and transmit the second light L2 reflected from the object 11 such that the second light L2 is incident to the light detector 120.

Figure 4:
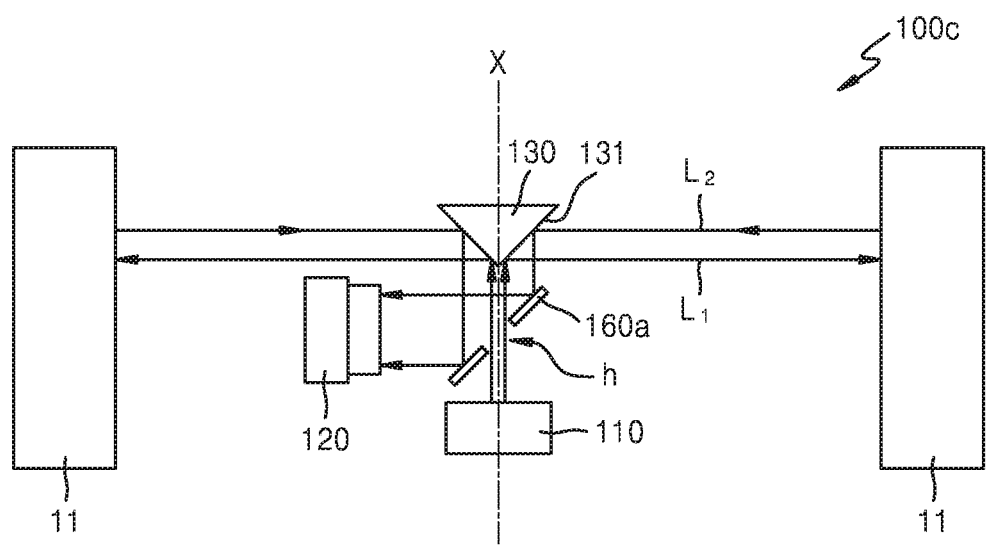
FIG. 4 illustrates a LIDAR device including a light path changer having a hole according to an embodiment.

FIG. 4 illustrates a LIDAR device 100*c* including a light path changer 160*a* having a hole h according to an embodiment. When compared with FIG. 2, the light path changer 160*a* may include the hole h through which the first light L1 emitted from the light source 110 is transmitted to the first reflector 130. The hole h may be arranged symmetrically with reference to the central axis X of the first reflector 130. Based on the first light L1 emitted from the light source 110 being incident to the first reflector 130 through the hole h, the light path changer 160*a* may be a reflective film in addition to being a beam splitter and a transflective film.

Figure 5:
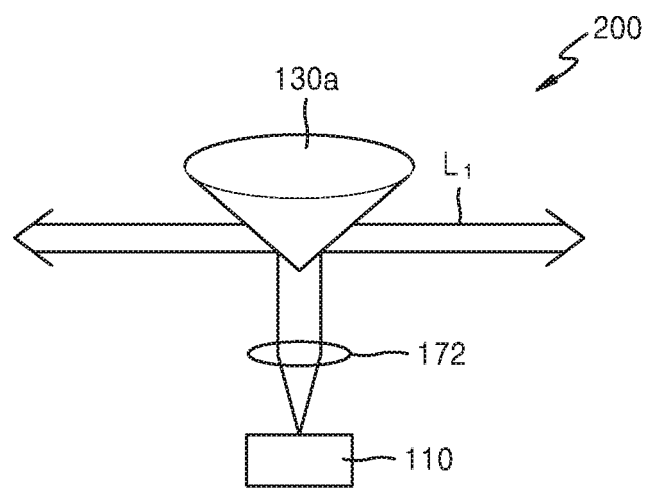
FIG. 5 illustrates a light transmission end according to an embodiment.

FIG. 5 illustrates a light transmission end 200 according to an embodiment. As shown in FIG. 5, a collimating lens 172 may be arranged between the light source 110 and a reflector 130*a*. The reflector 130*a* shown in FIG. 5 may be the second reflector 150 shown in FIG. 1 or the first reflector 130 shown in FIGS. 2 to 4. The first light L1 emitted from the light source 110 may be output as parallel light after being transmitted through the collimating lens 172. The parallel light may be incident to the reflector 130*a* and reflected to an omnidirection of the lateral direction. Based on the parallel light maintaining a parallel state thereof even after the parallel light is reflected from the reflector 130*a*, the parallel light may be more useful to recognize the object 11 located at a certain height from the ground.

Figure 6:
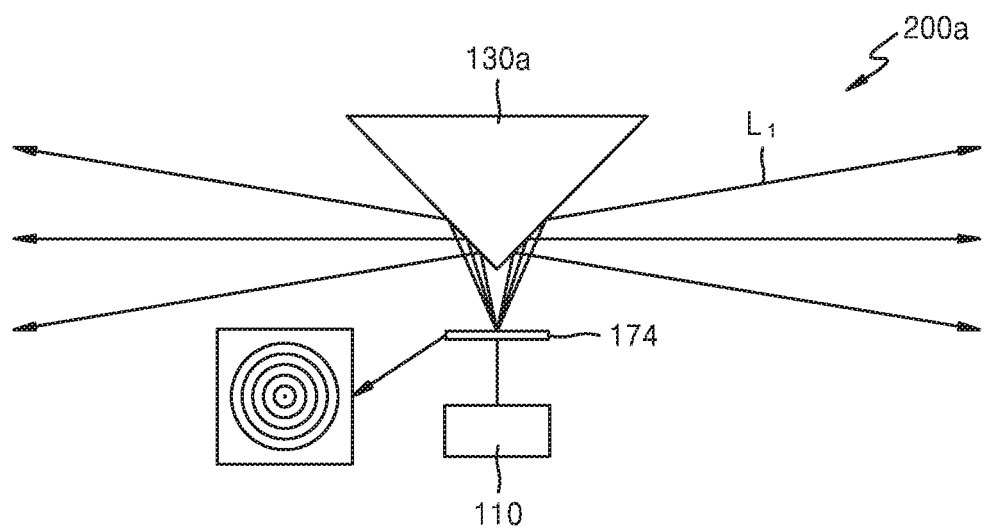
FIG. 6 illustrates a light transmission end including a diffuser according to an embodiment.

To recognize the object 11 located at various heights, the LIDAR device 100 according to an embodiment may further include a diffuser. FIG. 6 illustrates a light transmission end 200*a* including a diffuser 174 according to an embodiment. As shown in FIG. 6, the light transmission end 200*a* may further include the diffuser 174 between the light source 110 and the reflector 130*a*. Herein, the reflector 130*a* may be the first reflector 130 as illustrated in FIGS. 2, 3, and 4 or the second reflector 150 as illustrated in FIG. 1. The diffuser 174 may include a diffractive optical elements (DOE) lens capable of emitting light in a shape of several circles. The diffuser 174 may diffuse the first light L1 emitted from the light source 110 such that the diffused first light L1 is incident to the reflector 130*a*. The first light L1 reflected from the reflector 130*a* may be emitted on a space wider than that by the second reflector 150 shown in FIG. 1 or the first reflector 130 shown in FIGS. 2 to 4.

Figure 7:
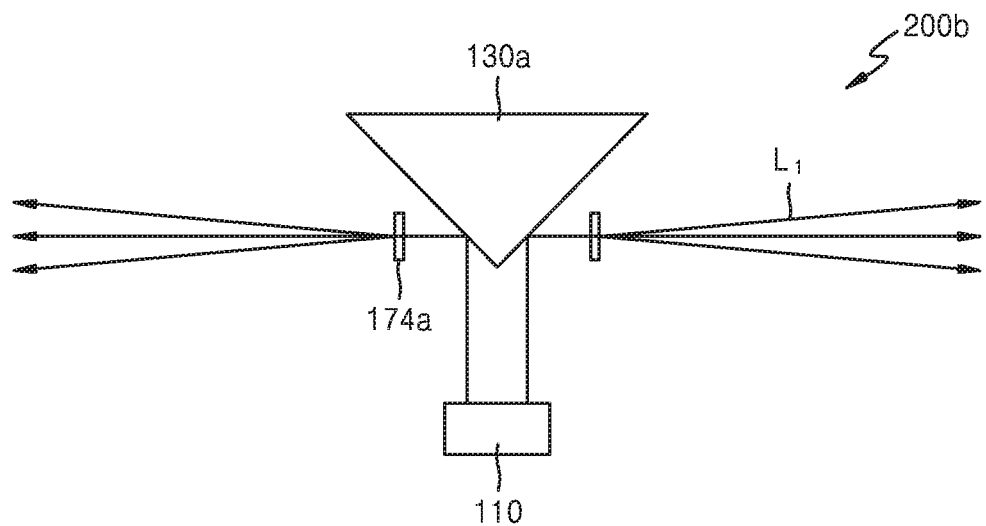
FIG. 7 illustrates a light transmission end including a diffuser according to an embodiment.

FIG. 7 illustrates a light transmission end 200*b* including a diffuser 174*a* according to an embodiment. The diffuser 174*a* shown in FIG. 7 may be arranged at an outer periphery of the reflector 130*a*, for example, between the reflector 130*a* and an object. Herein, the reflector 130*a* may be the first reflector 130 as illustrated in FIGS. 2, 3, and 4 or the second reflector 150 as illustrated in FIG. 1. Accordingly, the first light L1 emitted from the light source 110 may be reflected from the reflector 130*a* and then diffused by the diffuser 174*a*. The first light L1 diffused by the diffuser 174*a* may be emitted on an external space of various heights.

Figure 8:
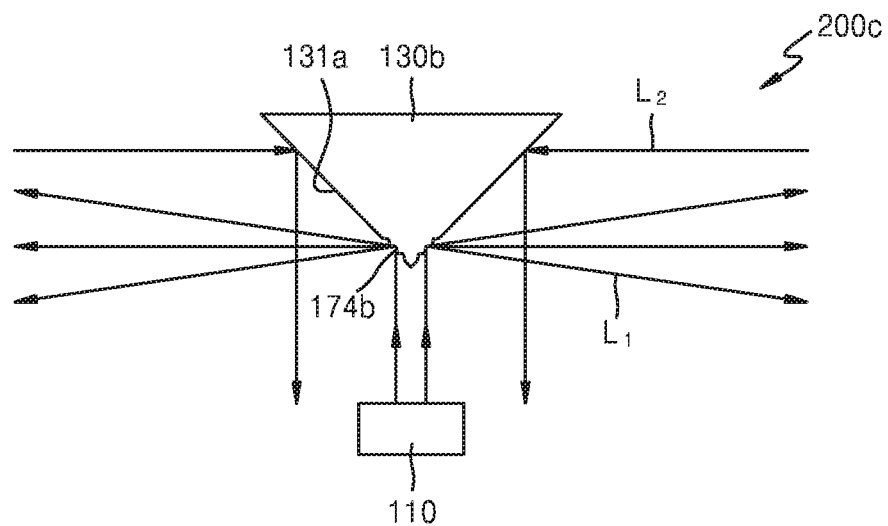
FIG. 8 illustrates a light transmission end including a diffuser according to an embodiment.

FIG. 8 illustrates a light transmission end 200*c* including a diffuser 174*b* according to an embodiment. As shown in FIG. 8, a first reflector 130*b* may include a first reflective surface 131*a* arranged in an upper area thereof and a diffuser 174*b* arranged in a lower area thereof. Accordingly, the first light L1 emitted from the light source 110 may be incident to the diffuser 174*b* of the first reflector 130*b*, reflected and diffused from the diffuser 174*b*, and emitted on an external space. In addition, the second light L2 incident from the external space may be reflected from the first reflective surface 131a and incident to a light detector. The diffuser 174b may include a concave and convex pattern. FIG. 8 shows that the diffuser 174b is integrated in the first reflector 130b. However, the diffuser 174b is not limited thereto. The diffuser 174b may be integrated in the second reflector 150.

Figure 9:
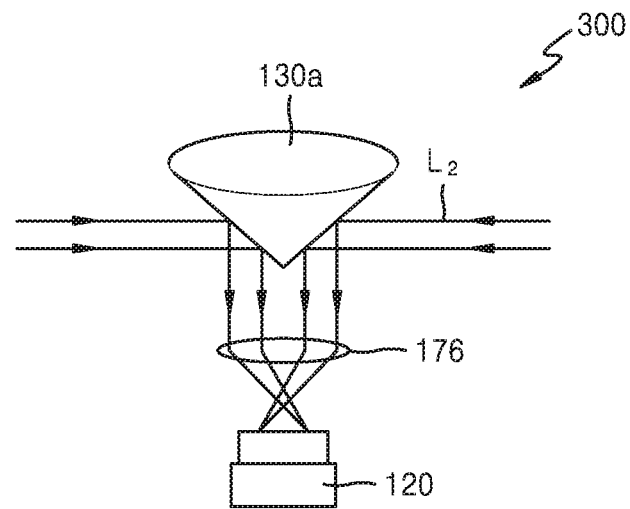
FIG. 9 illustrates a light reception end according to an embodiment.

FIG. 9 illustrates a light reception end 300 according to an embodiment. As shown in FIG. 9, a condensing lens 176 may be further arranged between the reflector 130a and the light detector 120. The reflector 130a may be the first reflector 130 shown in FIGS. 1 to 4. The condensing lens 176 may condense light reflected from the reflector 130a such that the condensed light is incident to the light detector 120. Because the condensing lens 176 condenses light, a cross-sectional size of the light detector 120 may be smaller than a cross-sectional size of the reflector 130a. Accordingly, the LIDAR device 100 may be miniaturized.

It has been described that the LIDAR device 100 emits light in an omnidirection of the lateral direction of the first reflector 130, i.e., the LIDAR device 100. The LIDAR device 100 according to an embodiment may be applied to, for example, a robot cleaner. The robot cleaner may generate a map or recognize a current location on the map by the LIDAR device 100 to recognize an object arranged in the lateral direction.

The LIDAR device 100 may need to recognize an object 12 arranged at a lower side thereof that has a smaller height than the LIDAR device 100. For example, the robot cleaner may control a motion of the robot cleaner by recognizing the object 12 arranged at a lower side thereof, e.g., an obstacle, while moving.

Figure 10:
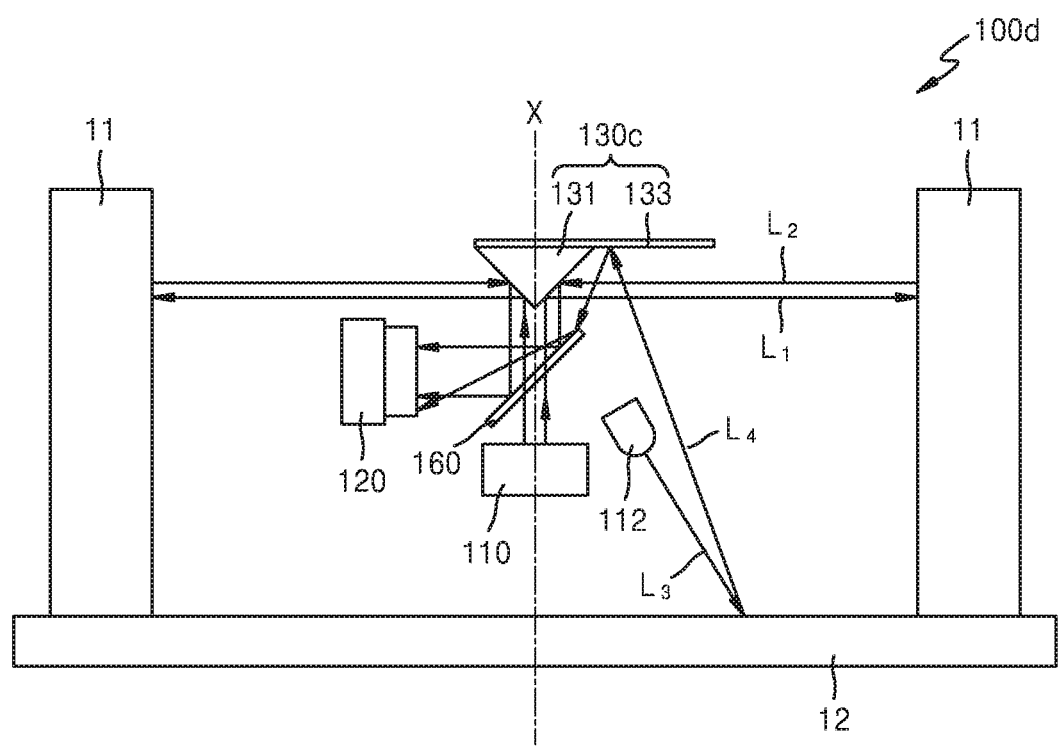
FIG. 10 illustrates a LIDAR device according to an embodiment.
Figure 11:
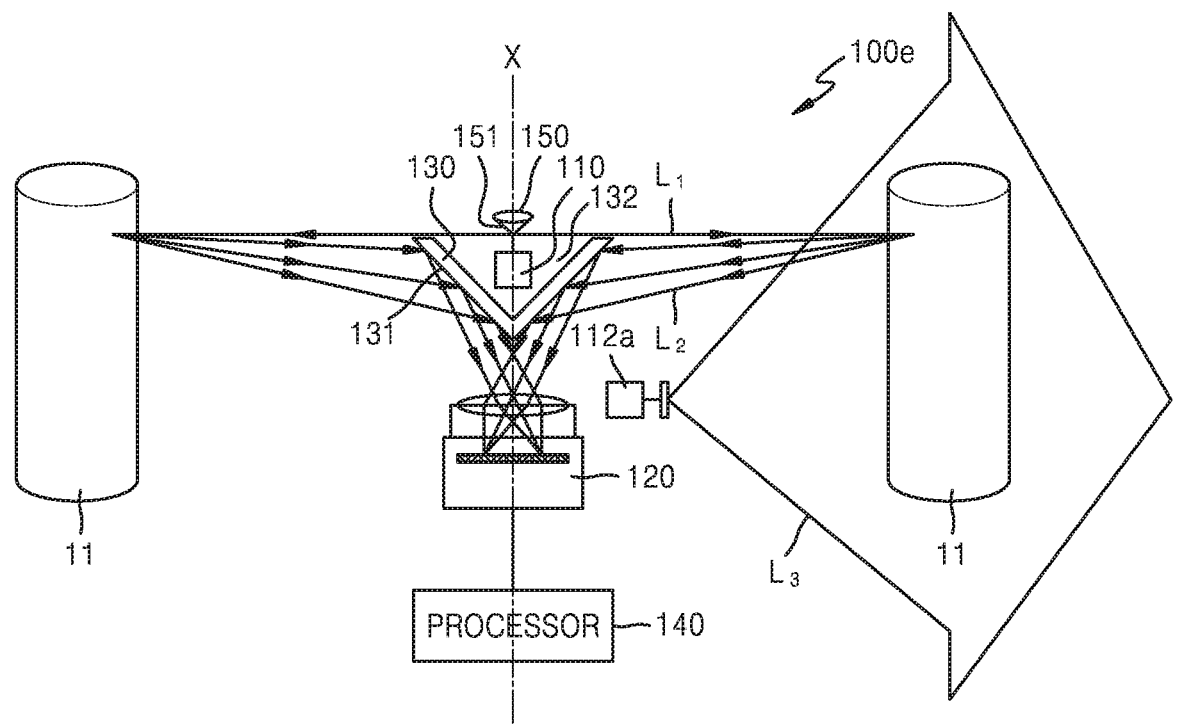
FIG. 11 illustrates a LIDAR device according to an embodiments.

FIGS. 10 and 11 illustrate LIDAR devices 100d and 100e according to embodiments. When compared with FIG. 1, the LIDAR device 100d of FIG. 10 may further include an additional light source 112 emitting third light L3 in a lower direction of a first reflector 130c.

The first light L1 output from the light source 110 may be emitted in the lateral direction of the LIDAR device 100d, and the third light L3 output from the additional light source 112 may be emitted in the lower direction of the LIDAR device 100d. Accordingly, a first space in which the first light L1 output from the light source 110 is emitted may differ from a second space in which the third light L3 output from the additional light source 112 is emitted. For example, the first space may not overlap at least a partial area of the second space. The first space may be a space in the lateral direction of the LIDAR device 100d, and the second space may be a space in the lower direction of the LIDAR device 100d.

A second reflective surface 133 may be further arranged on an upper end of the first reflector 130c. The second reflective surface 133 may be arranged to protrude from the upper end of the first reflector 130c toward the lateral direction of the first reflector 130c. Accordingly, fourth light L4 reflected or scattered from the object 12 among the third light L3 emitted in the second space may be sequentially reflected from the second reflective surface 133 and the light path changer 160 and incident to the light detector 120.

The first light L1 and the third light L3 may have the same wavelength or different wavelengths. When the first light L1 and the third light L3 have the same wavelength, the light source 110 and the additional light source 112 may alternately emit light, and the light detector 120 may also alternately detect the third light L3 and the fourth light L4 by being synchronized with the light source 110 and the additional light source 112. In addition, the processor 140 may also determine location information of the object 11 by being synchronized with the light detector 120 and using a location and a detection time of a pixel which has detected the third light L3 or the fourth light L4. When the first light L1 and the third light L3 have different wavelengths, the light source 110 and the additional light source 112 may alternately or simultaneously emit light. The light detector 120 may include pixels discriminatively arranged to detect respective wavelengths of the first light L1 and the third light L3.

According to an embodiment, as shown in FIG. 11, an additional light source 112a may emit the third light L3 having an emission angle different from that of the first light L1. The third light L3 may be emitted in both the lower direction and the lateral direction of the LIDAR device 100e. For example, the additional light source 112a may be illumination light having a relatively wide emission angle. Generally, the first light L1 may be used to recognize a portion of the object 11 located at a certain height, and the second light L2 may be used to recognize the object 11 located in a certain direction, e.g., at the front of the LIDAR device 100, regardless of the height of the object 11.

The first reflector 130 and the second reflector 150 described above have a reverse-cone shape. However, the first reflector 130 and the second reflector 150 are not limited thereto.

Figure 12:
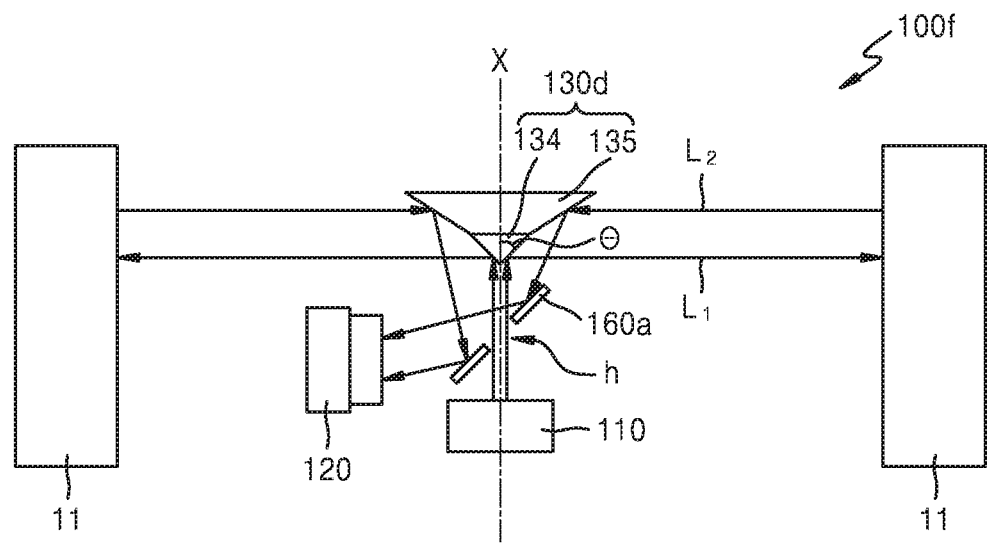
FIG. 12 illustrates a LIDAR device including a first reflector having a plurality of angles of inclination according to an embodiment.

FIGS. 12, 13, 14, and 15 illustrate first reflectors 130d, 130e, 130f, and 130g of various shapes. As shown in FIG. 12, the first reflector 130d has a reverse-cone shape but may have different angles of inclination θ according to areas thereof. For example, the first reflector 130d may include a first area 134 in which light is received to emit the light and a second area 135 in which light is received to detect the light. When the first light L1 emitted from the light source 110 is incident to the first reflector 130d along the central axis X, an angle of inclination θ of the first reflector 130d may be 45 degrees or less for uniform emission of light. Meanwhile, as the angle of inclination θ of the first reflector 130d is larger, pixels located at various locations of the light detector 120 may detect the second light L2 reflected or scattered from the object 11. Therefore, the angle of inclination θ of the first area 134 may be 45 degrees or less, and the angle of inclination θ of the second area 135 may be greater than 45 degrees and less than 90 degrees. However, the angles of inclination θ of the first area 134 and the second area 135 are not limited thereto. The angle of inclination θ of the first area 134 and the second area 135 may be differently determined according to locations of the light source and the light detector and an application purpose of a LIDAR device 100f.

Figure 13:
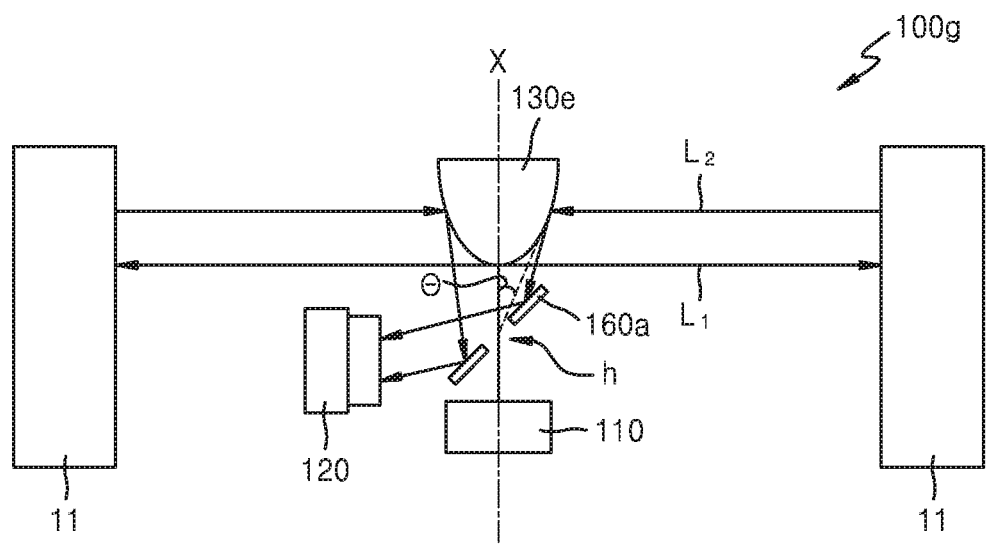
FIG. 13 illustrates a LIDAR device including a first reflector having a plurality of angles of inclination according to an embodiment.
Figure 14:
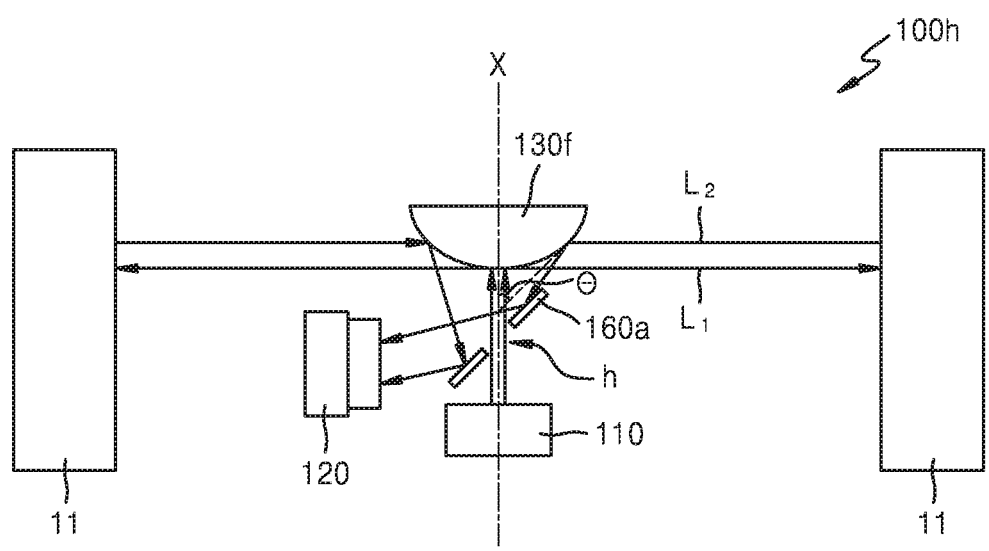
FIG. 14 illustrates a LIDAR device including a first reflector having a plurality of angles of inclination according to an embodiment.

According to an embodiment, as shown in FIGS. 13 and 14, the angles of inclination θ of the first reflectors 130e and 130f, i.e., an angle between the central axis X and a tangent of a first reflective surface, may continuously vary according to heights of areas of the first reflectors 130e and 130f. The angle of inclination θ discontinuously varies at a boundary between the first area 134 and the second area 135 in FIG. 12, whereas the angle of inclination θ may continuously vary from a lower area to an upper area thereof. FIG. 13 shows that the angle of inclination θ continuously decreases from a lower area to an upper area of the first reflector 130e to allow the second light L2 reflected or scattered from the object 11 to converge to the light detector 120. However, the rate of change in the angle of inclination θ is not limited thereto. For example, as shown in FIG. 14, the angle of inclination θ may continuously decrease at a slower rate from a lower area to an upper area thereof.

Figure 15:
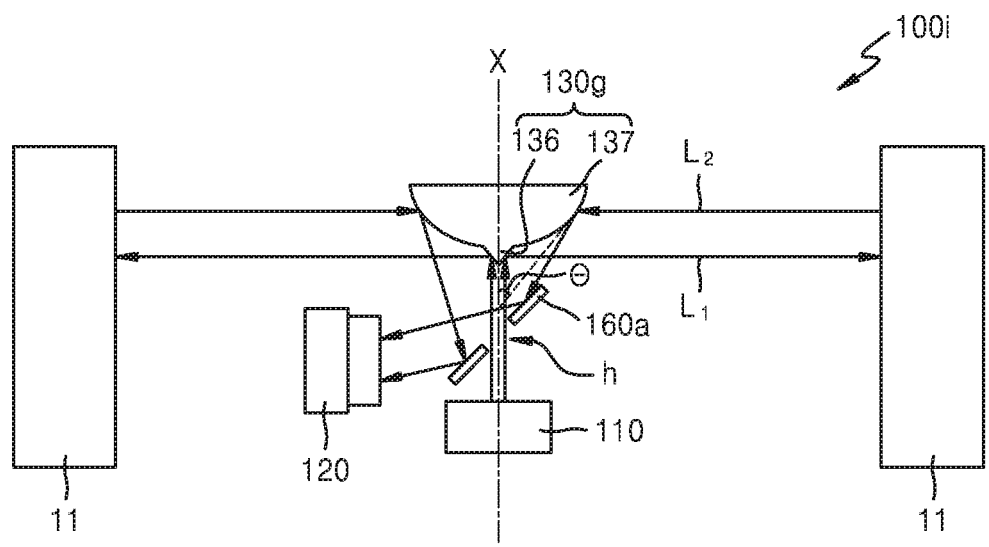
FIG. 15 illustrates a LIDAR device including a first reflector having a plurality of angles of inclination according to an embodiment.

According to an embodiment, as shown in FIG. 15, the angle of inclination θ of the first reflector 130g may be constant in a partial area of the first reflector 130g and continuously vary in the other partial area of the first reflector 130g. FIG. 15 shows that a lower area 136 of the first reflector 130g has a constant angle of inclination, and an upper area 137 of the first reflector 130g has the angle of inclination gradually decreasing upward. The lower area 136 is an area in which the first light L1 output from the light source 110 is emitted to an external space and may have the constant angle of inclination to emit light in a certain size of an external space. In addition, the upper area 137 may have the angle of inclination gradually decreasing upward to allow the second light L2 reflected or scattered from the object 11 to converge to the light detector 120. The angle of inclination θ of a reflector may be differently formed according to devices to which the LIDAR device 100 according to an embodiment is applied or objects to be recognized.

As described above, because a reflector has a shape symmetrical with reference to the central axis X and tapered from an upper area to a lower area thereof, the reflector may omnidirectionally receive or emit light. Accordingly, a separate motor or the like is not necessary, and thus, a structure of a LIDAR device may be more simplified and miniaturized.

Figure 16:
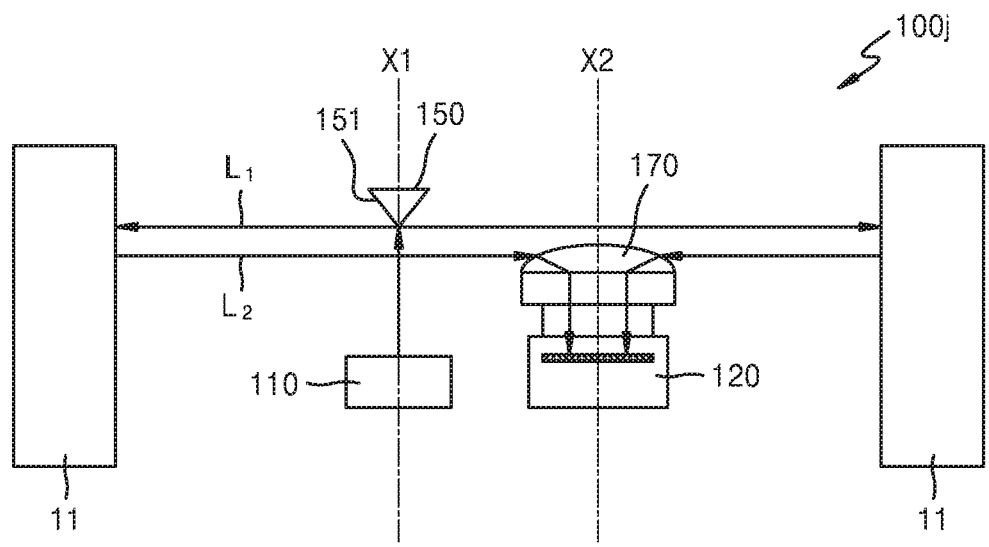
FIG. 16 illustrates a LIDAR device including a fisheye lens according to an embodiment.

A LIDAR device 100j according to an embodiment may transmit light by using a fisheye lens. FIG. 16 illustrates the LIDAR device 100j including a fisheye lens 170 according to an embodiment. As shown in FIG. 16, the LIDAR device 100j may include the light source 110 emitting the first light L1, the light detector 120 configured to detect the second light L2 that is a portion of the first light L1 reflected or scattered by the object 11 among the first light L1, the second reflector 150 emitting the first light L1 incident from the light source 110 to an omnidirection of the lateral direction, and the fisheye lens 170 refracting the second light L2 from an omnidirection such that the refracted second light L2 is incident to the light detector 120.

The second reflector 150 may include the reflective surface 151 having a tapered shape with a width gradually narrowing from an upper area to a lower area thereof. The reflective surface 151 of the second reflector 150 may include an area having a constant angle of inclination with reference to a central axis X1 of the second reflector 150 and an area having a variable angle of inclination with reference to the central axis X1. Because the second reflector 150 includes the reflective surface 151 having a tapered shape with a width gradually narrowing from an upper area to a lower area thereof, the second reflector 150 may emit light incident from a lower side of the second reflector 150 to the lateral direction. Based on the second reflector 150 having a symmetrical shape with reference to the central axis X1, the second reflector 150 may omnidirectionally emit light.

The fisheye lens 170 may have a relatively wide angle of 180 degrees or more. Based on the wide angle of the fisheye lens 170 being 180 degrees or more, the fisheye lens 170 may refract the second light L2 incident within the wide angle such that the refracted second light L2 is incident to the light detector 120. The fisheye lens 170 may not be arranged on a traveling path of the first light L1. The fisheye lens 170 may be arranged by being shifted away from the central axis X1. For example, a central axis X2 of the fisheye lens 170 may be identical to a central axis of the light detector 120, and may not be identical to the central axis X1 of the second reflector 150. The fisheye lens 170 may be arranged at a lower location than a location at which the second reflector 150 is arranged. Accordingly, the fisheye lens 170 may not receive the first light L1 emitted from the light source 110 or the first light L1 reflected from the second reflector 150.

When the incident second light L2 is refracted to the light detector 120 by using the fisheye lens 170, optical efficiency may be higher than when incident light is reflected to the light detector 120 by using a reflector.

According to an embodiment, the LIDAR device 100j may further include a processor configured to determine location information of the object 11 by using a detection result of the light detector 120. The location information of the object 11 may include at least one of a direction, a height, or a distance of the object 11 from the LIDAR device 100j. The processor may determine at least one of the direction or the height where the object 11 exists by using a location of a pixel in the light detector 120, which has detected light, and determine the distance to the object 11 from the LIDAR device 100j by using a light detection time of the pixel.

The processor may determine the direction where the object 11 exists by using an azimuth of a pixel in the light detector 120, the pixel having detected the second light L2. The processor may determine the height of the object 11, e.g., a height from the ground to the object 11, by using a distance from the pixel which has detected the second light L2 to the reference point of the light detector 120, e.g., a point where the central axis X2 meets the light detector 120. For example, the processor may determine that the greater the distance from the pixel which has detected the second light L2 to the reference point, the greater the height of the object 11.

In addition, the processor may detect a peak from an electrical signal applied from the light detector 120 and determine the distance to the object 11 by using the detected peak. For example, the processor may measure the distance to the object 11 by using a detection time of the detected peak and an emission time of light emitted from the light source 11.

Figure 17:
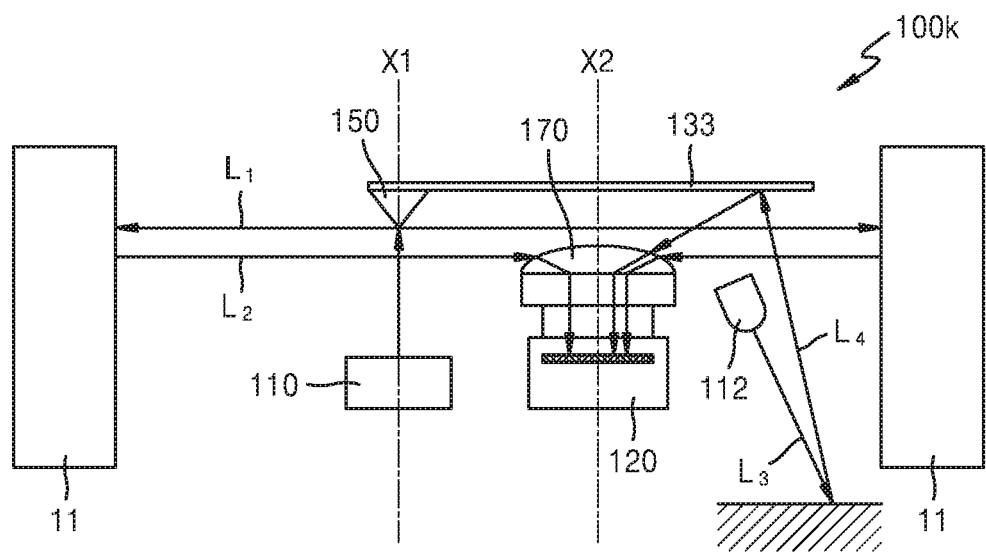
FIG. 17 illustrates a LIDAR device including the fisheye lens according to an embodiment.

FIG. 17 illustrates a LIDAR device 100k including the fisheye lens 170, according to an embodiment. When compared with FIG. 16, the LIDAR device 100k of FIG. 17 may further include the additional light source 112 emitting the third light L3 in a lower direction of the LIDAR device 100k. The first light L1 output from the light source 110 may be emitted in the lateral direction of the LIDAR device 100k, and the third light L3 output from the additional light source 112 may be emitted in the lower direction of the LIDAR device 100k. Accordingly, a first space in which the first light L1 output from the light source 110 is emitted may differ from a second space in which the third light L3 output from the additional light source 112 is emitted. For example, the first space may not overlap at least a partial area of the second space. The first space may be a space in the lateral direction of the LIDAR device 100k, and the second space may be a space in the lower direction of the LIDAR device 100k.

In addition, the second reflective surface 133 may be further arranged at an upper side of the fisheye lens 170. The second reflective surface 133 may be arranged to protrude from an upper end of the second reflector 150 toward the lateral direction of the second reflector 150. Accordingly, the fourth light L4 reflected or scattered from the object 12 among the third light L3 emitted in the second space may be reflected from the second reflective surface 133 and then incident to the light detector 120 through the fisheye lens 170. In addition, the second light L2 reflected or scattered from the object 11 among the first light L1 emitted in the first space may be incident to the light detector 120 through the fisheye lens 170.

The first light L1 and the third light L3 may have the same wavelength or different wavelengths. When the first light L1 and the third light L3 have the same wavelength, the light source 110 and the additional light source 112 may alternately emit light, and the light detector 120 may also alternately detect the third light L3 and the fourth light L4 by being synchronized with the light source 110 and the additional light source 112. In addition, the processor may also determine location information of the object 11 by being synchronized with the light detector 120 and using a location and a detection time of a pixel which has detected the third light L3 or the fourth light L4. When the first light L1 and the third light L3 have different wavelengths, the light source 110 and the additional light source 112 may alternately or simultaneously emit light. The light detector 120 may include pixels discriminatively arranged to detect respective wavelengths of the first light L1 and the third light L3.

Figure 18:
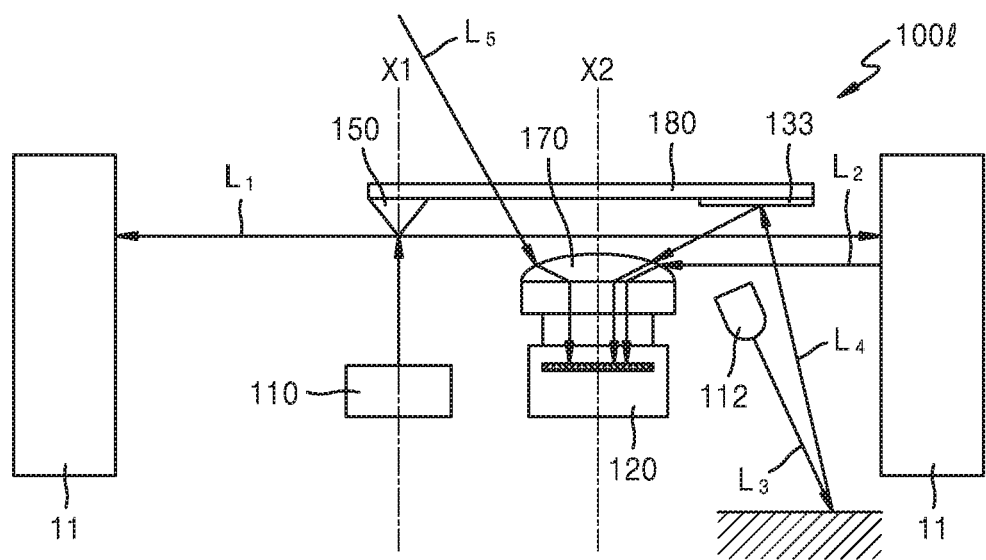
FIG. 18 illustrates a LIDAR device according to an embodiment.

FIG. 18 illustrates a LIDAR device 100l according to an embodiment. When compared with FIG. 17, the second reflector 150 and the second reflective surface 133 may be connected by using a transparent member 180. Accordingly, the fisheye lens 170 may also refract light L5 incident from an upper part of the LIDAR device 100l such that the refracted light L5 is incident to the light detector 120. The light L5 incident from the upper part may have a wavelength different those of the second light L2 and the fourth light L4.

As described above, according to embodiments, when a reflector and a fisheye lens are used, light may be omnidirectionally emitted or received even without a motor.

Further, according to embodiments, a structure of a LIDAR device may be more simplified by using a reflector omnidirectionally emitting or receiving light. In addition, omnidirectional light may be received by using a reflector or a fisheye lens without a motor.

Further still, according to embodiments, a structure of a LIDAR device may be more simplified by a reflector omnidirectionally emitting or receiving light.

In addition, according to embodiments, omnidirectional light may be received by using a reflector of a fisheye lens without a motor.

Many embodiments besides the embodiments described above exist in the following claims. The disclosure may have various modifications and various embodiments, wherein particular embodiments are illustrated in the drawings and described in the detailed description. However, the particular embodiments do not limit the disclosure to a particular carry-out form, and it should be understood that the particular embodiments include all modifications, equivalents, and substitutes included in the idea and the technical scope of the disclosure.

What is claimed is:

1. A light detection and ranging (LIDAR) device comprising:
    a first light source configured to emit first light;
    a second light source configured to emit third light to a second space other than a first space to which the first light is emitted, wherein the first space and the second space at least partially do not overlap, and the first light and the third light are alternately emitted;
    a first reflector configured to omnidirectionally receive second light that is light reflected or scattered by an object that is irradiated by the first light, and receive fourth light that is light reflected or scattered by the object that is irradiated by the second light, and reflect the second light and the fourth light;
    a second reflector arranged at an upper side of the first light source and configured to omnidirectionally emit the first light, the second reflector having a same shape as the first reflector and a size smaller than that of the second reflector;
    a light detector comprising a pixel array, the light detector being configured to alternately detect the second light reflected from the first reflector and the fourth light reflected from the first reflector by being synchronized with the first light source and the second light source; and
    a processor configured to acquire location information of the object based on detection of at least one of the second light and the fourth light by the light detector,
    wherein the first reflector comprises a cavity that is a vacant space provided inside an upper area of the first reflector, and the first light source is provided in the cavity and overlaps the first reflector.

2. The LIDAR device of claim 1, wherein the first reflector comprises a reflective surface symmetrical with reference to a central axis of the first reflector, the first reflector having a tapered shape with a width gradually narrowing from the upper area of the first reflector to a lower area of the first reflector.

3. The LIDAR device of claim 2, wherein the reflective surface comprises an area with a constant angle of inclination with respect to the central axis of the first reflector.

4. The LIDAR device of claim 2, wherein the reflective surface comprises an area with a variable angle of inclination with respect to the central axis of the first reflector.

5. The LIDAR device of claim 1, wherein the first reflector comprises at least one of an inverse hemispherical shape, an inverse semielliptical shape, or a reverse-conical shape.

6. The LIDAR device of claim 1, wherein the location information of the object comprises at least one of a direction of the object with respect to the LIDAR device, a height of the object from a ground surface, or a distance to the object from the LIDAR device.

7. The LIDAR device of claim 1, wherein the processor is further configured to determine at least one of a direction of the object with respect to the LIDAR device based on an azimuth of a pixel of the light detector, the pixel having detected the second light, a height of the object from a ground surface based on a distance from the pixel of the light detector which has detected the second light to a reference point, or a distance to the object from the LIDAR device based on a detection time at which the light detector detects the second light.

8. The LIDAR device of claim 1, wherein the first light source, the first reflector, and the light detector are sequentially provided along a central axis.

9. The LIDAR device of claim 1, further comprising a light path changer configured to change a path of the first light that is emitted from the first light source to be incident to the first reflector, and change a path of the second light that is reflected from the first reflector to be incident to the light detector.

10. The LIDAR device of claim 9, wherein the light path changer is further configured to transmit the first light that is emitted from the first light source to be incident on the first reflector, and
    reflect the second light that is reflected from the first reflector to be incident on the light detector.

11. The LIDAR device of claim 10, wherein the light path changer comprises a hole through which the first light emitted from the first light source is transmitted.

12. The LIDAR device of claim 10, wherein the light path changer comprises at least one of a beam splitter or a transflective film.

13. The LIDAR device of claim 9, wherein the light path changer is further configured to reflect the first light that is emitted from the first light source to be incident on the first reflector, and transmit the second light that is reflected from the first reflector to be incident on the light detector.

14. The LIDAR device of claim 1, further comprising a diffuser configured to diffuse the first light.

15. The LIDAR device of claim 1, further comprising a condensing lens provided between the first reflector and the light detector, the condensing lens being configured to condense the second light that is incident from the first reflector to be incident on the light detector.

* * * * *